US012776285B2

(12) United States Patent
Dambach et al.

(10) Patent No.: US 12,776,285 B2
(45) Date of Patent: Oct. 27, 2026

(54) LOCAL DIMMING ON VIDEO WALLS

(71) Applicant: BARCO NV, Kortrijk (BE)

(72) Inventors: Soeren Dambach, Weingarten (DE); Marcos Otero Gensheimer, Karlsruhe (DE)

(73) Assignee: BARCO NV, Kortrijk (BE)

( * ) Notice: Subject to any disclaimer, the term of this patent is extended or adjusted under 35 U.S.C. 154(b) by 0 days.

(21) Appl. No.: 18/719,398

(22) PCT Filed: Dec. 19, 2022

(86) PCT No.: PCT/EP2022/086651
§ 371 (c)(1),
(2) Date: Jun. 13, 2024

(87) PCT Pub. No.: WO2023/111352
PCT Pub. Date: Jun. 22, 2023

(65) Prior Publication Data

US 2025/0061864 A1 Feb. 20, 2025

(30) Foreign Application Priority Data

Dec. 17, 2021 (LU) .................................. LU501037

(51) Int. Cl.
*G09G 3/34* (2006.01)
*G09G 3/36* (2006.01)

(52) U.S. Cl.
CPC ............. *G09G 3/3426* (2013.01); *G09G 3/36* (2013.01); *G09G 2300/026* (2013.01);
(Continued)

(58) Field of Classification Search
CPC .. G09G 3/3426; G09G 3/36; G09G 2300/026; G09G 2320/0233;
(Continued)

(56) References Cited

U.S. PATENT DOCUMENTS

| | | | | |
|---|---|---|---|---|
| 2007/0103583 A1* | 5/2007 | Burnett | H04N 9/3147 | 348/383 |
| 2012/0062607 A1* | 3/2012 | Erinjippurath | G09G 3/342 | 315/294 |

(Continued)

FOREIGN PATENT DOCUMENTS

CN 105869579 B 1/2019

OTHER PUBLICATIONS

International Search Report and Written Opinion issued in PCT/EP2022/086651, dated Feb. 2, 2023, 10 pages provided.

*Primary Examiner* — Antonio Xavier
(74) *Attorney, Agent, or Firm* — HSML P.C.

(57) ABSTRACT

An image display device and method are described for displaying an image distributed over plural display tiles. The image display device has a plurality of backlight light sources for illuminating plural display tiles. Contiguous zones of at least one image pixel are defined in each display tile such that each zone has at least one associated backlight light source. In particular for each edge zone of each display tile a backlight brightness driving level is determined based on brightness level target values of pixels of the edge zone and based on brightness level target values of pixels of at least one other zone of another display tile adjacent to the edge zone.

21 Claims, 9 Drawing Sheets

(52) U.S. Cl.
CPC ............... *G09G 2320/0233* (2013.01); *G09G 2320/0238* (2013.01); *G09G 2320/0686* (2013.01); *G09G 2360/16* (2013.01)

(58) Field of Classification Search
CPC ... G09G 2320/0238; G09G 2320/0686; G09G 2360/16; G09G 2310/0232; G09G 2320/0285; G09G 2320/0646; G09G 2320/103
See application file for complete search history.

(56) References Cited

U.S. PATENT DOCUMENTS

| | | | | |
|---|---|---|---|---|
| 2015/0097853 | A1* | 4/2015 | Bastani | G09G 5/10<br>345/589 |
| 2019/0353961 | A1* | 11/2019 | Ji | G09G 3/3426 |
| 2021/0158766 | A1* | 5/2021 | Zhao | G09G 3/36 |
| 2023/0034485 | A1* | 2/2023 | Park | G06F 3/14 |
| 2023/0094077 | A1* | 3/2023 | Zhao | G09G 3/342<br>345/55 |
| 2023/0142417 | A1* | 5/2023 | Allen | G02F 1/133602<br>362/97.1 |

* cited by examiner

LOCAL DIMMING ON VIDEO WALLS

FIELD OF THE INVENTION

The invention relates to the field of image display, more particularly to an image display device and method for displaying an image distributed over plural display tiles, such as e.g. a display wall or a tiled display.

BACKGROUND

Display tiles using multiple backlight light sources are commonly used. An example of such display tiles is an LCD (Liquid Crystal Display) which for instance may use multiple LEDs as backlight light sources.

In FIG. 1 an example of an original image, i.e. a white or bright image object (1) on a black or dark background (2), is shown on a display tile. In this example, the display tile is an LCD with matrix backlight LEDs. No local dimming is performed, and, hence, the backlight LEDs are always fully on. As illustrated, this may cause bad black levels resulting in decreased image contrast. Reasons are, for example, technological limitations of an open cell (LCD glass). Light cannot be perfectly blocked, so that there is always some light leaking.

In FIG. 2, the same exemplary image is shown but now with local dimming being applied to the image display. The individual LEDs of the matrix backlight are controlled individually. Their brightness is set dependent on the content of the corresponding image. In this example, the backlight LEDs corresponding to the zones in the centre of the display are on, as there is white or bright content (1) in the image. The backlight LEDs corresponding to the zones at the borders of the display are off, as at the borders there is dark or black content (2). As illustrated in FIG. 2, when using local dimming, it is known to get a "halo" (3) around bright image objects in-between the bright and dark areas of an image, due to light leakage.

FIG. 3 shows an example of a display tile D, like the display tile in FIG. 2, displaying an image with a bright content (1) in the upper left corner zone of the display. The lower right corner of the display has no bright or white content but has dark or black content (2). By means of local dimming applied to the display tile, the backlight light sources (e.g. LEDs) are controlled to generate brighter light around content zone (1) and less bright light in the dark or black content zone (2). Also here a "halo" (3) is visible.

Up to now, displaying images on a single display tile has been addressed and the concept of local dimming of backlight sources has been introduced, which local dimming causes a "halo" in the transition region between bright image parts and dark image parts on the display, i.e. between bright and dark display zones. When displaying images on display walls or tiled displays, challenges increase. As an illustrative example, as shown in FIG. 4, a tiled display or display wall is created of four display tiles D1, D2, D4 and D5 positioned adjacent to one another. The tiled display or display wall displays an image consisting of a white or bright image object (1) on a black or dark background (2). The white or bright image object (1) is located in the upper left corner zone of the display tile D1 which is located in the lower right corner of the display wall or tiled display.

Like the display tiles of FIGS. 2 and 3, display tiles D1, D2, D4, D5 are LCD display tiles with matrix backlight LEDs. The individual LEDs of the matrix backlight are controlled individually. Their brightness is set dependent on the content of the corresponding image to be displayed.

The local dimming is determined for each display tile separately and is based on the image content of each display tile separately. In the example shown in FIG. 4, the backlight LEDs corresponding to the zone in the upper left corner of display tile D1 are on, as there is white or bright image content (1). Local dimming is performed on display tile D1 like in FIG. 2. Because there is a bright image content on display tile D1 only, which image content hence does not extend to the adjacent display tiles D2, D4, D5, there will be no local dimming effect on display tiles D2, D4, D5. Consequently, if the bright image content on display tile D1 is positioned close to adjacent display tile D2, there will be a discontinuity in the brightness around that bright image content as shown in FIG. 4. The same will be the case between display tiles D1 and D5 and display tiles D1 and D4. Indeed, there are different black levels at the border between display tiles D1 and D2 on the one hand, and display tiles D1 and D5 on the other hand, as well as between the top left corner zone of display tile D1 and the bottom right corner zone of display tile D4. This poses a problem as it results in a low displaying quality of the overall image. Moreover, the viewer will notice that the display wall consists of discrete separate display tiles and, thus, perceive the entire image as a juxtaposition of image parts.

When displaying an image on a display wall or tiled display, the image is distributed over more than one display tile, and in view of the above, there is a need for generating a better harmonized wall experience for the viewer, and it is desirable to keep the visible gap or seam between adjacent display tiles as narrow as possible.

An aim of the present invention can be to avoid brightness discontinuities in the image over the display tiles, over which the image is distributed, both in the bright parts of the image as well as in the dark parts of the displayed image.

An aim of the present invention can be to improve image contrast of an image distributed of display tiles of a display wall or tiled display by employing local dimming while reducing "halo" effects.

An aim of the present invention can be to provide an improved display wall experience for the viewer.

SUMMARY OF THE INVENTION

The above aims are achieved by the claims of the present patent application, which define an image display device, a method for displaying an image, a device for controlling backlight light for displays, a computer program product and a non-transitory signal storage means.

The present invention comprises an image display device for displaying an image distributed over plural, i.e. two or more, display tiles. The display tiles can be flat or curved. The display tiles can form a tiled display such as e.g. a display wall. The tiled display can be flat or curved. The tiled display can be a video display wall and/or a portrait (i.e. static) display wall.

The image display device comprises a two, three, four or more display tiles each comprising a plurality of backlight light sources. The latter are for illuminating a plurality, i.e. two, three, four or more, of display tiles positioned adjacent to one another, the display of each display tile having a plurality of contiguous zones being defined such that each zone comprises at least one image pixel, said zones comprising edge zones, the edge zones being the zones having at least one side coinciding with an edge of the display of the display tile, wherein said backlight light sources are configured such that each zone has at least one backlight light source associated therewith.

The plurality (at least two) of display tiles can be positioned adjacent to one another with minimal gap or seam therebetween. The gap or seam between adjacent display tiles may be optimized, i.e. reduced, such as to minimize the optical gap perceived by a viewer located at viewing distance from the front of the display tile.

The plurality (at least two) of display tiles can be positioned having their front surfaces, i.e. their display surface, in a substantially same or parallel plane, typically the XY plane or parallel thereto. The display tiles may be curved or flat. The display tiles can be positioned in a line, for instance a horizontal, a vertical or an angled line in said plane. The display tiles can be positioned in said plane in a matrix arrangement, as for example shown in FIG. 4.

The plurality of backlight light sources may be LEDs. Per display, the LEDs may be arranged as a matrix backlight. The LEDs and the zones of the display tiles may be configured such that each zone has a single LED associated therewith for illuminating said zone. Said single LED may be an RGB LED or a white LED.

The image display device according to the present invention may further comprise a processor configured

- to retrieve image data related to the image to be displayed by the image display device,
- to determine a first backlight brightness value for each zone of each display tile based on the image data associated with the image pixels in said zone, and
- to obtain at least in each of the edge zones of each of the display tiles a second backlight brightness value based on the first backlight brightness value of the edge zone and the first backlight brightness value of at least one other zone of another display tile adjacent to the edge zone.

The processor can be implemented as an on-board FPGA or a CPU.

The processor, when determining a first backlight brightness value for each zone of each display tile based on the image data associated with the image pixels in said zone, may be configured to extract from the image data a brightness value for each pixel in the zone and to calculate the mean average of the brightness values of all pixels in the zone.

When calculating the mean average of the backlight brightness value, each pixel backlight brightness value or pixel backlight brightness level target value may optionally be multiplied with a pixel weight. For each pixel in each zone, the pixel weight may range from 0 to 1. The pixel weight for each pixel may be selected dependent on the position of the pixel in the zone. The pixel weight may decrease from the centre towards the border of a zone.

The calculated mean average backlight brightness value for each zone, with or without pixel weight adaptation, may optionally further be adapted by replacing the mean average value by a first brightness value if the mean average value is greater than zero and smaller than the first brightness value. Moreover, optionally a threshold value may be introduced such that if the mean average brightness value is equal to or greater than the threshold value, the mean average value is replaced by a second brightness value for the zone. The second brightness value for the zone may correspond to the maximum brightness level which can be set for the backlight light source for illuminating that zone.

The first brightness values and the threshold values may be selected dependent on displaying conditions such as ambient light and viewer distance.

Furthermore, the first brightness values and the threshold values may be selected dependent on the images displayed and, in particular, whether it concerns static images or dynamic images (video). Moreover, they may be chosen to be different for different image frames. For static images, the selection may be such as to reduce halo effects, while for dynamic images the selection may be such as to have smooth content movements without noticeable flicker and pumping effects.

The processor may be configured to adjust the first backlight brightness value at least in each of the edge zones of each display tile to obtain a second backlight brightness value, said second backlight brightness value being determined based on the first backlight brightness value of the edge zone and the first backlight brightness value of at least one other zone of another display tile adjacent to the edge zone.

The processor may be configured to execute the adjustment of the first backlight brightness values for all edge zones simultaneously. Alternatively, the adjustment may be executed sequentially for each of the display tiles. In case the image to be displayed comprises multiple image frames, the adjustment may be executed for each image frame. Alternatively, the frequency of adjustment may be determined dependent on the amount of change of image content between subsequent image frames. For example, backlight brightness values related to image data of image frame x and the backlight brightness values for the next frame x+1 can be calculated and compared, and then only adjusted if the backlight brightness values of image frame x+1 are different from those of image frame x.

The adjustment of the first backlight brightness values may be such that at a border between two adjacent display tiles, the second backlight brightness values of the edge zones of the first display tile of the two adjacent display tiles near the border are determined based on the first backlight brightness values of at least the edge zones of the second display tile near the border, and the second backlight brightness values of the edge zones of the second display tile near the border are determined based on the first backlight brightness values of at least the edge zones of the first display tile near the border.

Hence, at a border between adjacent display tiles of a tiled display, the backlight brightness values of at least the edge zones of the respective display tiles near that border mutually influence one another.

In an exemplary embodiment of the invention, an image display device is provided for displaying an image distributed over at least 4 rectangular display tiles part of, for example, a display wall or tiled display. The at least 4 rectangular display tiles are arranged in a matrix such that at least one corner edge zone of a display tile is adjacent to three other display tiles. The processor of the image display device is configured to obtain a second backlight brightness value for said corner edge zone based on the first backlight brightness value of said corner edge zone and the first backlight brightness values of at least one other zone of each of the three display tiles adjacent to said corner edge zone.

The image display device according to the present invention may further comprise a driver for driving in each edge zone the respective at least one associated backlight light source in order to generate a light output corresponding to the second backlight brightness value.

The processor may be further configured to determine for each zone for each first or second backlight brightness value a corresponding backlight driving level used by the driver for driving the backlight light sources associated with that zone. The backlight driving level for that zone corresponding to the backlight brightness value determined for that zone may be retrieved using a predetermined look-up conversion table mapping backlight brightness values on backlight driving levels. The look-up table may be generated in a calibration phase wherein the light output of the backlight light sources is determined or measured for a range of backlight driving levels. The look-up table may be stored in a memory accessible to the processor.

The present invention also relates to a device for controlling backlight light for displays, the device comprising a plurality of backlight light sources for illuminating plural display tiles positioned adjacent to one another, each display tile having a plurality of contiguous zones being defined such that each zone comprises at least one image pixel, said plurality of zones of each display tile comprising edge zones, being the zones having at least one side coinciding with an edge of the display tile, said backlight light sources being configured such that each zone of each display tile has at least one backlight light source associated therewith;

a processor configured to retrieve image data related to the image to be displayed and configured to determine a first backlight brightness value for each zone of each display tile based on the image data associated with the image pixels in said zone, and configured to obtain, at least in each of the edge zones of each of the display tiles, a second backlight brightness value based on the first backlight brightness value of the edge zone and the first backlight brightness value of at least one other zone of another display tile adjacent to the edge zone.

The device can further comprise a driver configured to drive in each edge zone of each display tile the at least one associated backlight light source in order to generate a backlight light output corresponding to the second backlight brightness value.

The plural display tiles can comprise at least four rectangular display tiles arranged in a matrix such that at least one corner edge zone of one of said rectangular display tiles is adjacent to three other rectangular display tiles, and a second backlight brightness value for said corner edge zone can be obtained based on the first backlight brightness value of the corner edge zone and the first backlight brightness values of at least one other zone of each of the three other rectangular display tiles adjacent to the corner edge zone.

The second backlight brightness value, designated as $B_{0,0,new}$, of said corner edge zone in accordance with the formula $$B_{0,0,new} = \sum_{m=0}^{l} \frac{1}{P_m} \sum_{n=1}^{2m+1} B_{m,n-1}$$

1: the total number of levels in the respective other adjacent display tiles, a level being the number of the at least one other zone in one row or in one column of the respective other adjacent display tiles, the first backlight brightness value of which is used in the calculation of the second backlight brightness value $B_{0,0,new}$, m=0 is for the corner edge zone, m>0 is for the zones of the adjacent displays, B: backlight brightness value of the respective zone, P: variable between 1 and ∞.

At a border between a display tile and another display tile, which is adjacent to the display tile, the second backlight brightness values of the edge zones of the display tile near the border can be based on the first backlight brightness values of at least the edge zones of the another display tile near the border, and the second backlight brightness values of the edge zones of the another display tile near the border can be based on the first backlight brightness values of at least the edge zones of the display tile near the border.

The second backlight brightness value, designated as $C_{0,0,new}$, of an edge zone of the display tile near the border can be determined in accordance with the formula $$C_{0,0,new} = \sum_{m=0}^{l} \frac{1}{Q_m} C_l$$

1: total number of levels in the adjacent another display tile, a level being the number of the edge zones in one row or in one column of the adjacent another display tile, the first backlight brightness value of which is used in the calculation of $C_{0,0,new}$, m=0 is for the edge zone of the display tile, m>0 is for the edge zones of the adjacent another display, C: backlight brightness of the respective zone, Q: variable between 1 and ∞.

Definitions

Display Unit or Display Panel or Display Tile, for the sake of clarity further called display tile, is a multi-layered image formation device that can comprise an image forming layer (such as LCD, . . . ) and a backlight layer that can illuminate the image forming layer. A display tile may be implemented in a single display. The image forming layer can comprise a multiple of light sources, e.g. LEDs. A display tile can comprise light sources that provide backlight light which is modulated into an image, or the light sources can emit light and form an image directly. Examples of the latter type of light sources are Light Emitting Diodes (LEDs) or (Active-Matrix) Organic Light Emitting Diodes (AMOLEDs or OLEDs) and variations thereof.

The present invention is applicable to display tiles with backlight. A display tile has a front (display) side or surface and a back side or surface. The front and back side are first and second major surfaces as these are the largest. The front display side is the side which has light emitting pixels. The display tile has lateral sides or edges. If a display tile is rectangular in shape, then there are four lateral sides or edges. Pairs of lateral sides oppose each other and are parallel to each other. A lateral side or edge is perpendicular to the adjoining lateral side or edge. A display tile can have a backlight matrix comprised of rows and columns defining zones in the display tile arranged in a rectangular grid in accordance with the backlight matrix. Each zone can have one or more light sources (e.g. LED) of the backlight matrix associated therewith. Each display tile can be selected to have the same number of rows and columns as the other display tiles of the same display wall. A display tile can have, for example, a 10×10 backlight matrix, i.e., for example, 10 rows and 10 columns defining zones in the display tiles arranged in a rectangular grid in accordance with the backlight matrix. It can be a smaller number of rows and/or columns or a larger number. The number of rows can also be different from the number of columns.

Display Wall, Tiled Display. A multiple of display tiles may be tiled next to each other in a matrix to implement a larger display that can be referred to as a "display wall" or "tiled display" on which they together can display one image. The display tiles in the display wall can be arranged in the same plane or in different planes. The individual display tiles may be planar or curved. The illustrative embodiments in this text comprise flat displays, but the present invention may also be suitable for curved display tiles and curved display walls.

LED. Light Emitting Diode.

OLED. Organic Light Emitting Diode.

AMOLED. Active-Matrix Organic Light Emitting Diode.

A Pixel is a picture element being an addressable unit, a plurality of which provides the capacity of a display tile or a display unit or a display to display an arbitrary image.

Liquid Crystal Display. A Liquid Crystal Display uses liquid crystals to modulate the amount of backlight provided to each pixel (each pixel also comprises further elements, such as polarizing sheets and colour filters). The amount of emitted backlight can be modulated by altering a corresponding signal that drives the liquid crystals, e.g. voltage or current. This can be referred to as a driving level or a digital driving level. It is also possible to indirectly obtain the emitted backlight by extracting the present voltage- or current levels. Alternatively, the backlight brightness can be obtained by measuring the luminance of the backlight. For very dark image content, there should be little or no backlight provided to the pixels of that zone (see below for "zone"). But there can be light leakage from brighter zones in the display which can result in a halo effect that may increase the brightness level of dark zones.

Driving level. A driving level, or digital driving level, can be applied to a system input signal to make the system provide a desired output signal. The signal can e.g. be a current signal or a voltage signal. The relationship between the input- and the output signal can be obtained and stored upfront in a look-up table.

Black Level. The Pixel Black Level is the brightness emitted by a single pixel in the special case when the backlight driving level given to a pixel or addressable unit is 0. The black level depends only on the light coming from the backlight layer through light leakage. For example, with the TFT (thin-film transistor) LCD technology comprises the act of blocking a constant supply of light, but the blocking is not 100% efficient, so there is light leakage deteriorating the black level.

White Level. The Pixel White Level is the brightness emitted by a single pixel in the special case the backlight driving level given to a pixel or addressable unit is maximum. The white level depends only on the light coming from the backlight layer.

Pixel contrast. The light-dark contrast of a pixel is defined as the ratio of the maximum and minimum pixel brightness of that particular pixel.

Image Contrast. The contrast is the quotient of the white level and the black level.

Matrix Backlight. A Matrix backlight is a specific arrangement of light sources in a backlight layer. The light sources are arranged horizontally and vertically in a matrix (or grid) structure. The number of light sources is less than the number of pixels in a LCD display. One light source illuminates multiple pixels. The light emitted by a light source depends on a backlight driving level given to a light source or addressable unit.

A Dimming Level can be given as a percentage of the maximum brightness level which is at 100%. It is desired to obtain a high contrast of the display wall, and this may be obtained by decreasing the backlight behind dark parts of the image. This can be referred to as "local dimming" of the display wall. A dimming level can correspond to a backlight driving level.

The pixel brightness level target can be referred to as the backlight defined with respect to the desired image content before any reduction of brightness or dimming level adjustment. And the backlight brightness can be referred to as the resulting backlight brightness after implementing dimming by reducing the brightness of the backlight.

Dimming Zone. A dimming zone comprises a group of pixels associated with at least one backlight light source. For example, in FIG. 7 the central display tile Dc comprises 100 light dimming zones and 100 backlight light sources, with one or more backlight light source(s) per zone.

Global Dimming. The backlight driving level given to the backlight light sources (to obtain a desired dimming level) is the same for all the light sources of a display tile.

Local Dimming or conventional local dimming. The backlight driving levels given to the backlight light sources are not the same for all the backlight light sources. The backlight driving level of a backlight light source depends on the pixel brightness level target of the dimming zone that is associated with that backlight light source.

The halo effect. The halo effect is caused by local dimming where the light emitted by the backlight light sources of different dimming zones is different (because the image content or pixel brightness level target associated with that zone is different). This difference arises from light leakage from a bright zone to a less bright zone. Hence, within a single display tile, such leakage will vary continuously across the display tile. Between the display tiles on a display wall, the tile borders stop further leakage between zones of different tiles, and there is a discontinuity, as can be seen in FIG. 4. This causes different black levels across display tile borders.

For explanatory purposes, display walls and display tiles are shown in an x-y plane. Display surfaces have their viewing direction in the positive z direction, if not otherwise indicated. The figures are made for illustrative purposes and members may not have correct proportions to each other.

DETAILED DESCRIPTION

Figure 5:
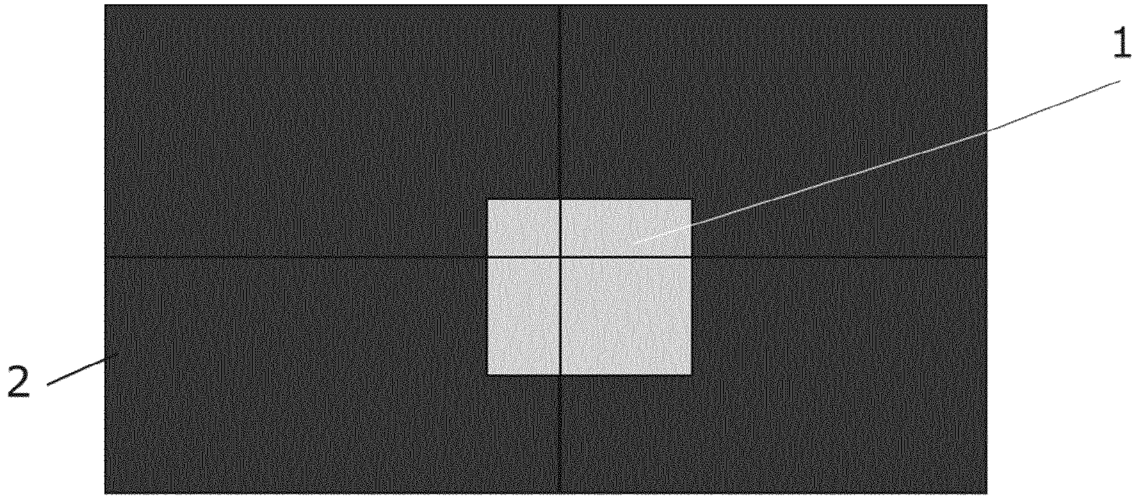
FIG. 5 shows an example of a white or bright image object in the centre of the image displayed on a display wall according to the present invention.
Figure 6:
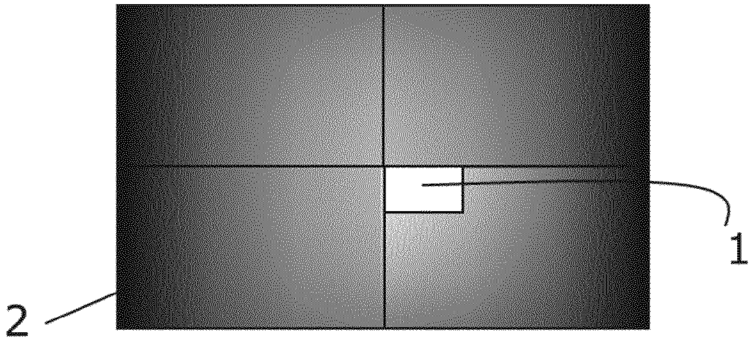
FIG. 6 shows an example of a white or bright image object on a black background displayed on a display wall according to the present invention.

The present invention achieves an improved display wall experience for the viewer as illustrated in FIGS. 5 and 6.

Figure 1:
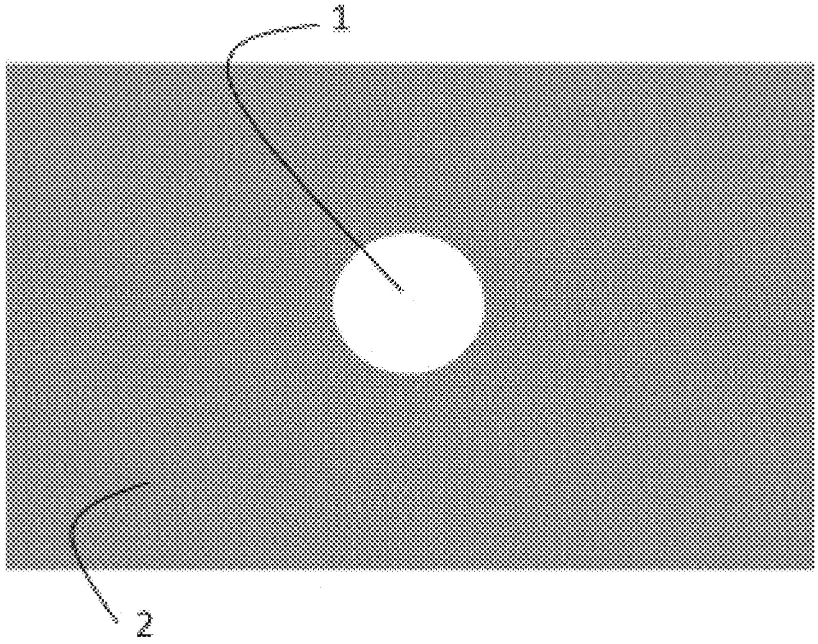
Fig. 1 (Prior Art)
FIG. 1 shows an example of a white or bright image object on a black background displayed on a display tile according to the prior art.
Figure 2:
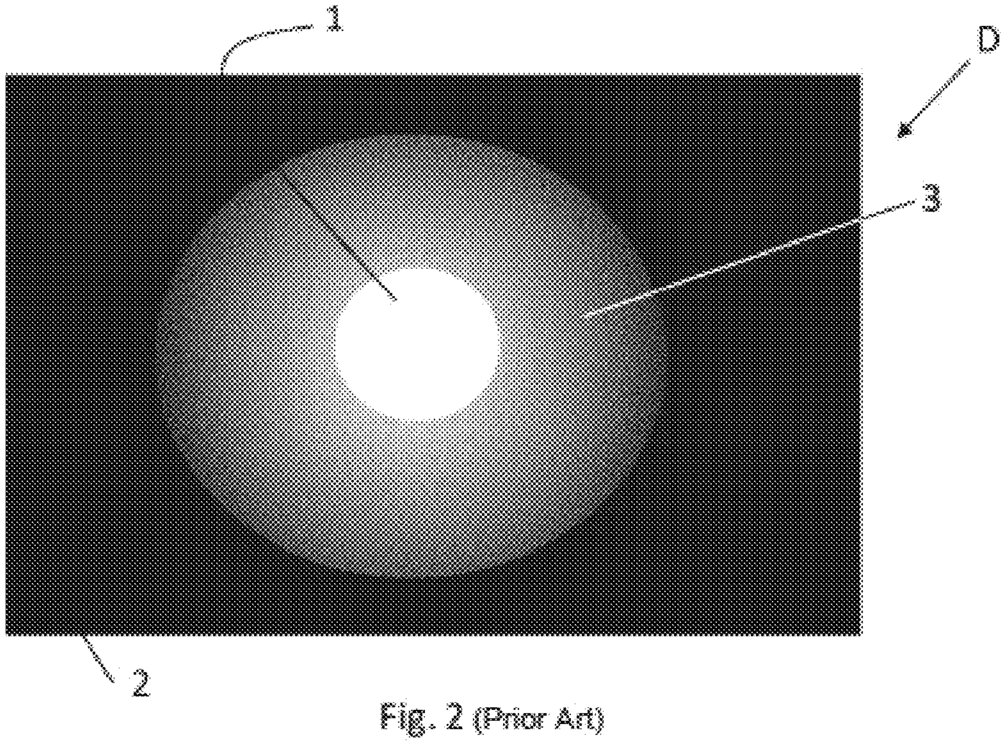
Fig. 2 (Prior Art)
FIG. 2 shows an example of a white or bright image object on a black background displayed on a display tile using local dimming according to the prior art.
Figure 3:
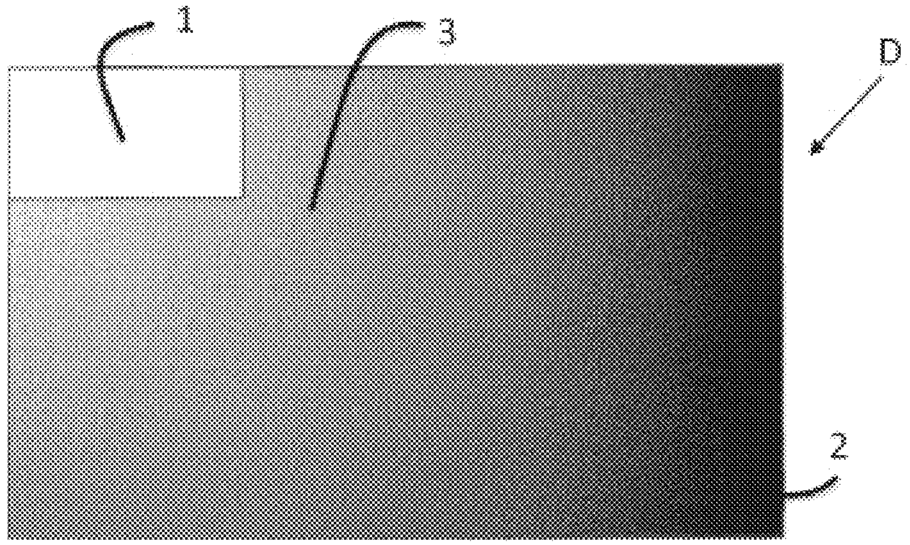
Fig. 3 (Prior Art)
FIG. 3 shows an example of a white or bright image object in the upper left corner of the image displayed on a display tile using local dimming according to the prior art.
Figure 4:
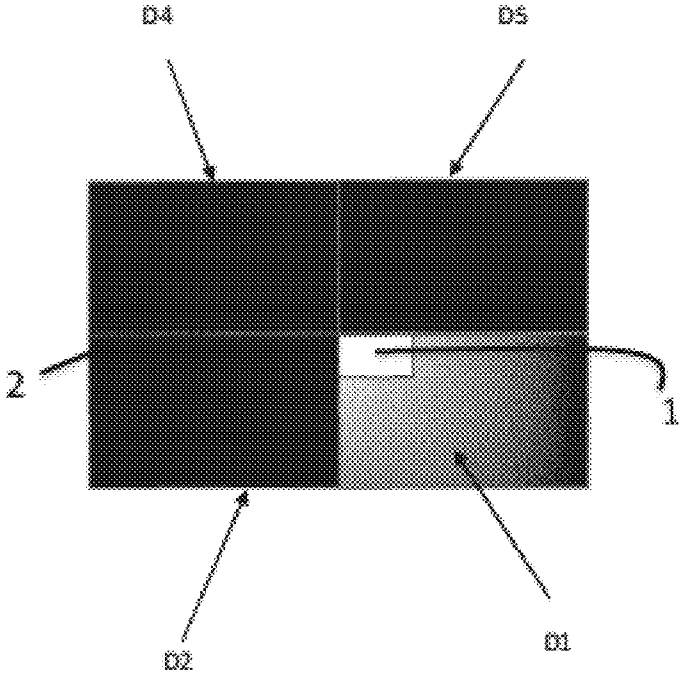
Fig. 4 (Prior Art)
FIG. 4 shows an example of a white or bright image object on a black background displayed on a display wall using local dimming according to the prior art.

The images shown in FIGS. 5 and 6 demonstrate that the bright parts of the images displayed are perceived by the viewer with equal brightness, regardless whether bright parts (1) of an image are displayed in a single display tile (FIG. 6) or distributed over multiple display tiles (FIG. 5). Also, for the dark parts (2) of the images displayed, no discontinuity in brightness is perceived by the viewer over the display tiles. This is an improvement compared to the image displayed on the display wall shown in FIG. 4.

It is clear that the invention is not restricted to a display wall consisting of four display tiles and that it is applicable to any number of display tiles in the x-direction and in the y-direction.

The basic principle of the present invention will be explained starting with FIG. 7. Solely for the purpose of explanation, a display wall of nine display tiles in a 3 by 3 arrangement is shown. In this example, the nine display tiles are designated Dc for the central display tile, D0 for the display tile above, D1 for the display tile at the top right corner of Dc, D2 right hand side of Dc, D3 for the display tile at the bottom right of Dc, D4 for the display tile below Dc, D5 for the display at the bottom left of Dc, D6 for the display tile at the left hand side of Dc, D7 for the display tile at the top left corner of Dc.

In this example, each display tile is an LCD with a LED backlight matrix. Display tile Dc may have or does have a backlight matrix comprised of rows and columns defining zones in the display tile arranged in a rectangular grid in accordance with the backlight matrix. Display tile Dc has, for example, a 10×10 LED backlight matrix, i.e., for example, 10 rows and 10 columns defining zones (4) in the display tiles arranged in a rectangular grid in accordance with the LED backlight matrix. Each zone has therefore one LED light source of the LED backlight matrix associated therewith. It can be a smaller number of rows and/or columns or a larger number. In the present example, each display tile has been selected to have the same number of rows and columns as the other display tiles of the same display wall (not completely shown). Hence, for each display tile 100 contiguous rectangular zones are defined (only shown in FIG. 7 for the centre display tile Dc). As, further to the present example, each display tile can be selected to be a HD display having 1920×1080 pixels, each zone comprises 192×108 pixels.

In a next step, in each of the zones of the display wall, a backlight brightness value is determined for the zone based on the image data or pixel brightness level target associated with the image pixels in that zone. The determination is now further explained in more detail for a first zone of the display wall. Image data of the image to be displayed on the display wall associated with the pixels of the first zone are retrieved by a processor. Then, the retrieved image data associated with each of the pixels in the first zone are processed such as to determine an average brightness value. By means of example, a way of determining the average brightness value for the first zone will now be described.

As explained before, the first zone, like all the zones of the display wall, contains 192×108 pixels. As an example, the processor used is a 24 bit processor. The image data are in RGB format, meaning that each 24 bit pixel is defined by three subpixels, respectively a Red, Green, and Blue 8-bit subpixel. With a bit depth of 8, maximum 256 color values can be assigned ranging from 0, representing the level with the minimum brightness, to 255, representing the level with maximum brightness. The image data either are already in 24-bit format or they are converted in the digital 24 bit format by the processor after retrieval.

Figure 8:
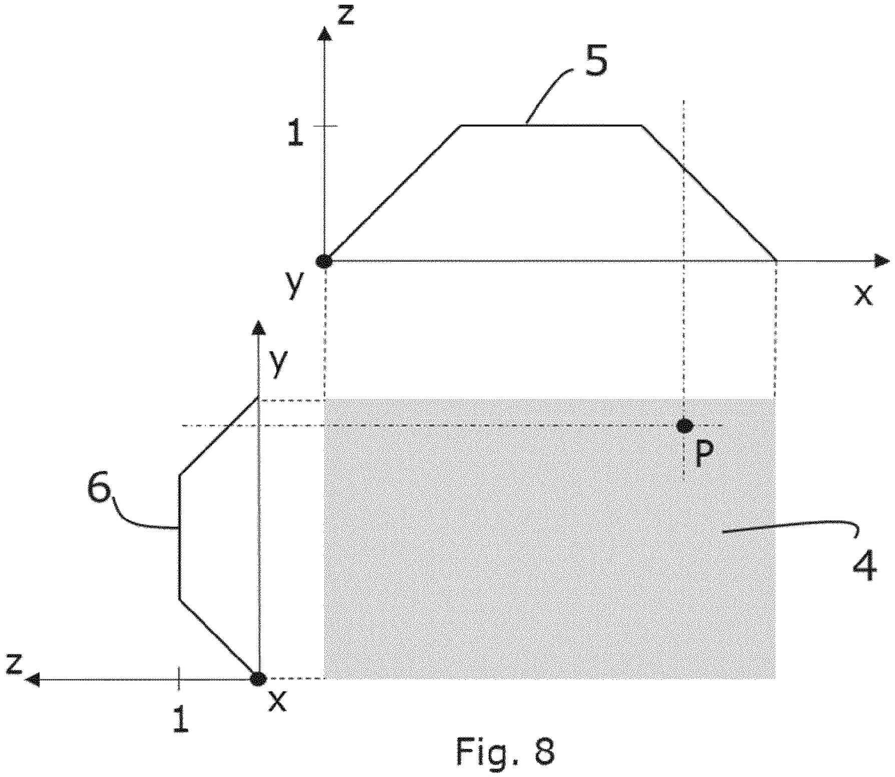
FIG. 8 shows an example of profile indicating the weight of a pixel for all the pixels in a zone in x and y direction.

When calculating the average backlight brightness value, each pixel in the zone (4) can be given an equal weight or a weight may be given to each pixel in the range from zero to one, dependent upon its position in the zone using a specific profile in x (5) and y (6) direction for the zone as shown in FIG. 8.

Using this profile shown in FIG. 8, in accordance with formula 1, the total weight of a pixel is a product of the weight in the x-direction and the weight in the y-direction.

$$w_t(x, y) = w_x(x) \cdot w_y(y) \quad \text{(formula 1)}$$

The example shown in FIG. 8 shows a pixel P close to the border of the zone. The total weight of this particular pixel P will be smaller than a pixel closer to the centre of the zone as the brightness will be higher for a pixel closer to the centre.

The brightness of a pixel P in position (x, y) is the product of its weight as provided in formula (1) and the maximum brightness of the R, G or B sub-pixel of that particular pixel P(x, y) as provided by formula (2).

$$b_{RGB}(x, y) = w_t(x, y) \cdot \max(R(x, y), G(x, y), B(x, y)) \quad \text{(formula 2)}$$

The average brightness value is then being determined by dividing the sum of all pixel brightness values in the zone by the total number of pixels in the zone (size), as in formulas 3 to 5, where x[size] and y[size] are the total number of pixels in the x and y direction in the zone, respectively.

$$\text{sum} = \sum_{x=0}^{x_{size}-1}\left(\sum_{y=0}^{y_{size}-1} b_{RGB}(x, y)\right) \quad \text{(formula 3)}$$

$$\text{size} = \sum_{x=0}^{x_{size}-1}\left(\sum_{y=0}^{y_{size}-1}(1)\right) \quad \text{(formula 4)}$$

$$avg = \frac{\text{sum}}{\text{size}} \quad \text{(formula 5)}$$

Figure 9:
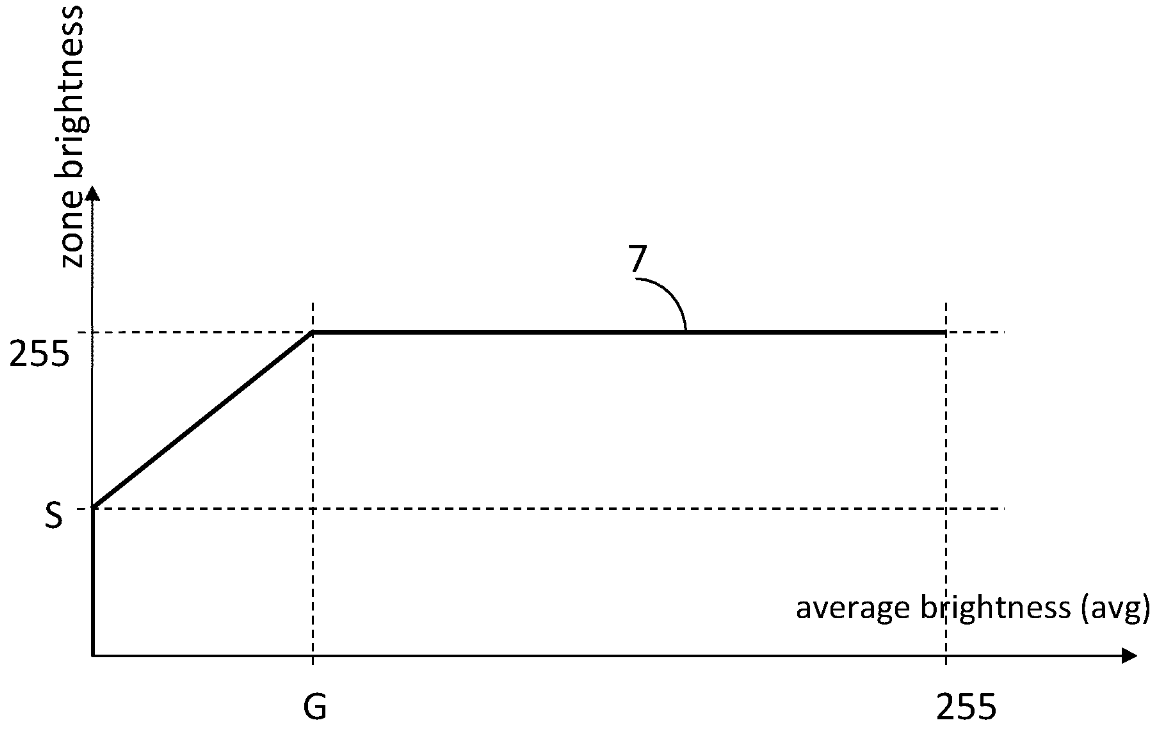
FIG. 9 shows an example of a brightness profile indicating the relation of the average brightness value of a zone versus the backlight brightness value of a zone.

The average brightness value obtained constitutes the backlight brightness value for the first zone. Alternatively, the backlight brightness value of the first zone is obtained by adjusting the average brightness value using a brightness profile. An example of such profile (7) is shown in FIG. 9. That profile (7) is defined such that the zone backlight brightness equals the average brightness in case the average brightness is zero. For non-zero average brightness values the profile is further defined by two key numbers, namely Sensitivity S and Gain G (as shown in FIG. 9). The Sensitivity S of the brightness profile is defined as the lowest zone backlight brightness value for non-zero average brightness values. The Gain G of the brightness profile is defined as the lowest average brightness value for which the zone backlight brightness value is the maximum (e.g., 255 for a bit depth of 8). The profile being defined such that the zone backlight brightness is maximal (255) in case the average brightness is greater than or equal to G, else the zone backlight brightness is according to the linear gradient part of the profile. Values for the Sensitivity S and Gain G may be selected dependent on displaying conditions such as ambient light and viewer distance. As an example, in case the requirement would be that a single pixel can be seen under 500 lm ambient brightness at a distance of 3 m with a human eye, then the Sensitivity S should be at least 16. S can be any value within the available range of levels, e.g. between 0 and 255 for a bit depth of 8. This depends on what sensitivity is desired, i.e. how important it is to be able to see an individual pixel. The lower the S value, the less visibility of a small feature. The standard for work environment says 500 lm. The gain G then depends on the sensitivity S and the human eye sensitivity and can be found by eye inspection. Hence, G can also be any value selected in the available range of levels. Furthermore, Sensitivity S and Gain G may be selected dependent on the images displayed and in particular whether it concerns static images or dynamic images (video). Moreover, Sensitivity S and Gain G may be chosen to be different for different image frames of dynamic images or a sequence of static images. For static images the selection may be such as to reduce halo effects, while for dynamic images the selection may be such as to have smooth content movements without noticeable flicker and pumping effects.

Note that in this example both the pixel brightness level targets and the backlight brightness of the zone have a same bit depth of 8, i.e. 256 levels with a maximum brightness value of 255. The pixel brightness level targets and the backlight brightness of the zone can have different bit depths, e.g. the brightness level target of a pixel may for instance have a bit depth of 10 (i.e. 1024 levels), while the backlight brightness of the zone has a bit depth of 8. In such case, the formulas to calculate the average brightness can still be used. The resulting average brightness value which may then range from 0 to 1023 is then mapped on the range of levels 0 to 255 of the backlight brightness of the zone. This may e.g. be done by mapping the four lowest levels 0, 1, 2, and 3 on 0, the subsequent four levels 4, 5, 6 and 7 on 1, etc. Alternatively, in case the backlight brightness value of the zone is obtained by adjusting the average brightness value using a brightness profile, then the profile is adapted to map a 1024 level range on the average brightness axis on a 256 level range on the zone brightness axis. This mapping can be used wherever there is a difference in bit depth between the pixel brightness level target and the backlight brightness.

Having now, by means of example, determined a backlight brightness value for the first zone, clearly the processor can extend this to all zones of the display wall such that for each zone a backlight brightness value is determined. This can be done simultaneously or sequentially for each zone of the display wall, or simultaneously or sequentially for each display tile of the display wall (or the tiled display).

In a next step, the processor will adjust the backlight brightness values of edge zones of the display tiles of the display wall. Edge zones of a display tile are the zones having at least one side coinciding with an edge of the display tile. In FIG. 7, only the edge zones of the central display tile Dc, i.e. the zones with the horizontal stripes (8), are indicated for illustration purposes. The adjustment of the backlight brightness value of an edge zone of a display tile by the processor is done by using the backlight brightness value of that edge zone and the backlight brightness value of at least one other zone of another display tile adjacent to that edge zone.

It will now be continued to explain this adjustment for the edge zones (8) of the central display tile Dc only. Clearly, however, each display tile of the display wall has edge zones having brightness values associated therewith that may be adjusted taking the brightness values of adjacent zones of adjacent tiles into account. Hence, at the border between two display tiles, the brightness values of at least the edge zones of the respective display tiles near that border mutually influence one another. As an example, assume that there would be only dark image content in the central display tile Dc, then the brightness values of each of the zones of central display tile would be zero in accordance with the determination discussed above. However, in the edge zones of Dc the respective brightness values may be different from zero as in each edge zone the brightness value may be adjusted dependent on the image data of the neighbouring zones of adjacent display tiles. Thus, even if there is only dark image content in display tile Dc and there is bright content (i.e. zone brightness value>0) in at least some or all of the adjacent display tiles, including corner display tiles, by transmitting the brightness value information from these adjacent display tiles to Dc, the latter will display white or bright content (i.e. brightness value>0) at least in some of its edge zones.

It has to be determined for each edge zone to be adjusted which other zones of other display tiles adjacent to that edge zone will be taken into account for adjusting the backlight brightness value of that edge zone. For explanatory purposes only and, hence, merely as example, let us assume that the zones of other display tiles adjacent to the edges zones of central display tiles are defined as the three levels of zones surrounding the edge zones of central display tile Dc, i.e. the dotted zones (9) in FIG. 7. Clearly, adjacency could also be defined as an arbitrary selection from 1 to 5 levels. Alternatively, the number of adjacent zones of another display tile or tiles may be chosen individually for each edge zone and could range from 1 to 20, or from 1 to 50, and may be different for each edge zone. The selection of adjacent zones of another display tile for an edge zone of the central display tile Dc may be done dependent on the shortest distance of the adjacent zone to that edge zone.

Further to our example, in case three levels are chosen surrounding the central display tiles, then a rectangular band of adjacent zones (9) around the central display tile Dc is defined, virtually extending the 10×10 matrix of zones of the central display tile to a 16×16 matrix of zones. The three level rectangular band of adjacent zones of other display tiles includes zones of all eight display tiles adjacent to the central display tile Dc, i.e. D0 to D7. In particular, referring to the matrix arrangement, Dc is extended towards each of its adjacent corner display tiles with three rows/columns to each of its corner display tiles D1, D3, D5 and D7, with three rows to adjacent display tiles D0 and D4 and with three columns to adjacent display tiles D2 and D6. Alternatively, there may be other combinations, for example and not restricted hereto, one or two or four or another number of rows/columns to corner display tiles D1, D3, D5 and D7 and analogously to adjacent display tiles D0 and D4 and adjacent display tiles D2 and D6. Hence, central display tile Dc now disposes of the brightness information of a 16×16 matrix of brightness values while there are physically only 10×10 matrix zones of Dc. The brightness value information of the or part of the 16×16 matrix has to be used for the actual (physical) 10×10 matrix of central display tile Dc, thus the 16×16 matrix has to be mapped to the actual 10×10 matrix, by transmitting the information consisting of the brightness values from the levels of the adjacent display tiles and the corner display tiles to central display tile Dc.

The mapping of the virtual 16×16 matrix on the actual 10×10 matrix is implemented by using the information relating to the brightness values of the zones of the surrounding three levels (rows and columns as explained above) of the adjacent display tiles, including the corner display tiles, for adapting the brightness values of respectively the four corner edge zones and the edge zones, located between two consecutive ones of these corner edge zones, of the central display tile Dc. Examples are visualized in FIG. 10 which shows the central display tile Dc (including its edge zones) and the rectangular band of zones (9) of three levels of adjacency of the surrounding display tiles D0 to D7 of FIG. 7. For example, with respect to the top left corner edge zone of central display tile Dc (8*a*): brightness values relating to the bottom right corner zones of display tile D7 in combination with the brightness values relating to the left column zones of display tile D0 and in combination with the brightness values relating to the upper row zones of display tile D6 is mapped on central display tile Dc, in order to adapt the brightness value of its top left corner edge zone.

Figure 10:
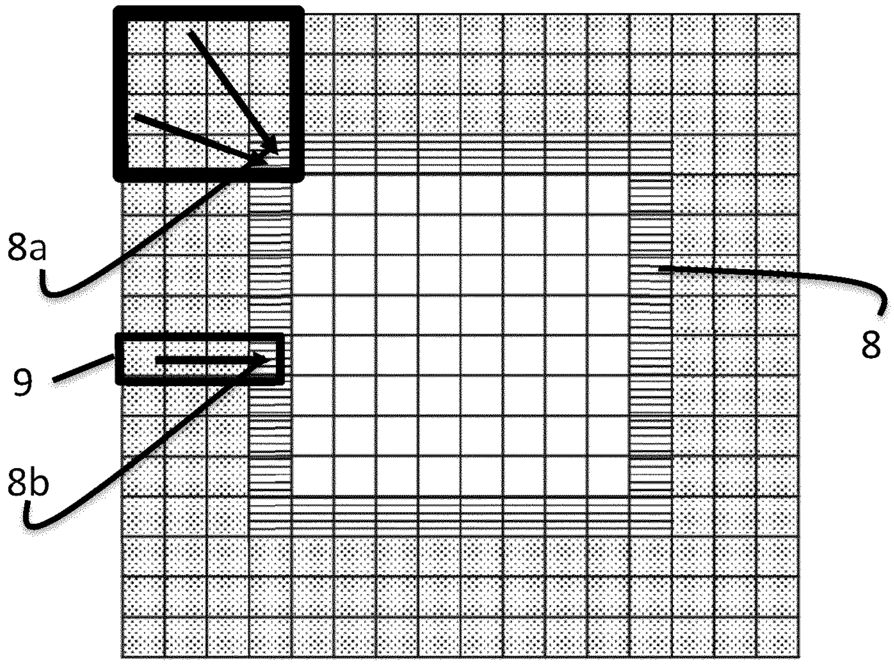
FIG. 10 shows the central part of FIG. 7, i.e. display tile Dc and the rectangular band of zones (9).
Figure 11A:
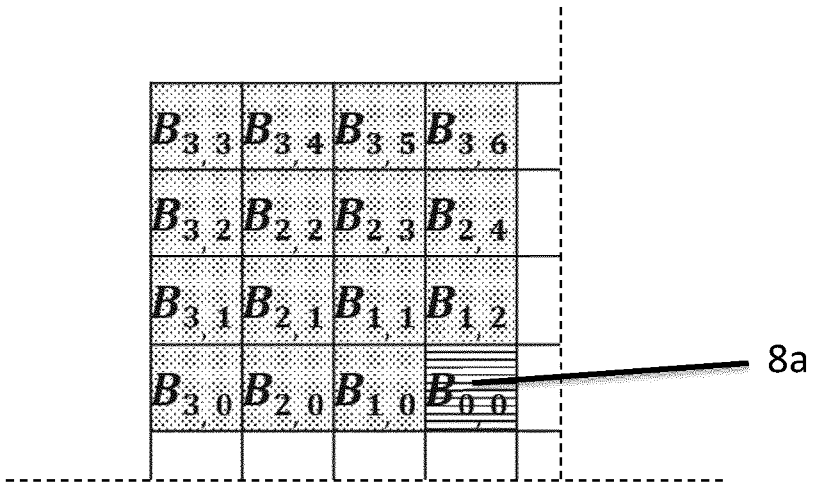
FIG. 11*a* shows an enlargement of the upper left part of FIG. 10 including a corner edge zone of central display tile Dc.

This example is developed further as shown in FIG. 11*a* which is an enlargement of the upper left part of FIG. 10. The brightness values of the above-mentioned zones in the three level adjacency band of display tiles D7, D0 and D6 are designated as for level 1: $B_{1,0}$ to $B_{1,2}$, for level 2: $B_{2,0}$ to $B_{2,4}$ and for level three: $B_{3,0}$ to $B_{3,6}$. The brightness value of corner edge zone of display tile Dc is designated as $B_{0,0}$.

Upon applying the algorithm of the present invention, the brightness values of the above-mentioned zones of adjacent display tiles D7, D0 and D6 are transmitted to display tile Dc and this information is used in order to calculate a new brightness value, designated as $B_{0,0,new}$, which is an adjusted brightness value of the corner edge zone of central display tile Dc. This calculation is expressed in formula (6).

$$B_{0,0,new} = \sum_{m=0}^{l} \frac{1}{P_m} \sum_{n=1}^{2m+1} B_{m,n-1} \quad \text{(formula 6)}$$

1: total number of levels in the respective other adjacent display tiles, a level being the number of the at least one other zone in one row or in one column of the respective other adjacent display tiles, the first backlight brightness value of which is used in the calculation of $B_{0,0,new}$, B: brightness of the respective zone, P: variable between 1 and ∞.

A typical example of P could be for level 0: P=1.2, level 1: P=15, for level 2: P=30, for level 3: P=100.

Figure 7:
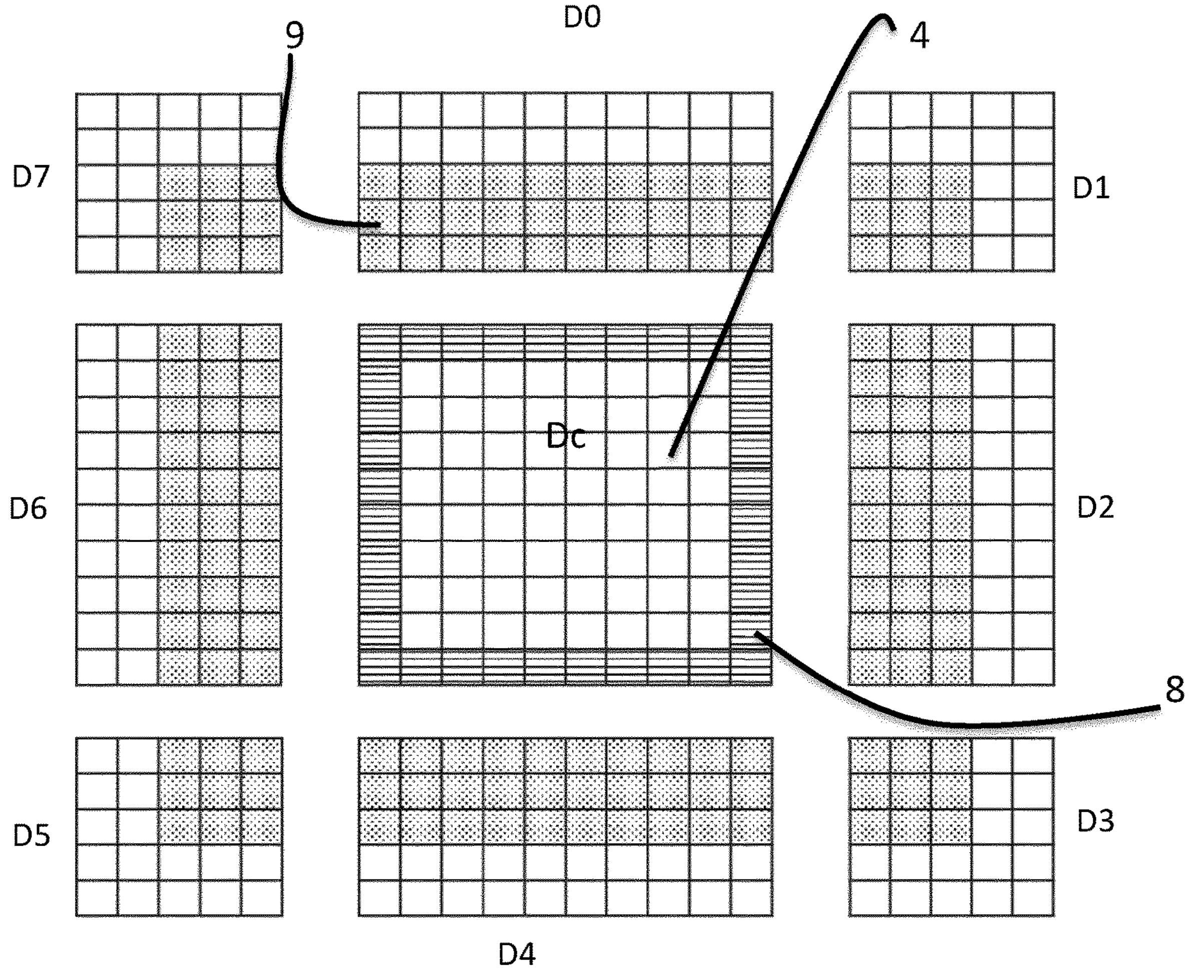
FIG. 7 shows an example of a display wall of nine display tiles in a 3 by 3 arrangement wherein zones are defined.

The procedure as explained here above for the upper left corner edge zone (8*a*) of the central display tile Dc is also applicable to each of the other three corners edge zones of display tile Dc shown in FIG. 7. Applying results in adjusted brightness values in each corner edge zone of Dc.

Figure 11B:
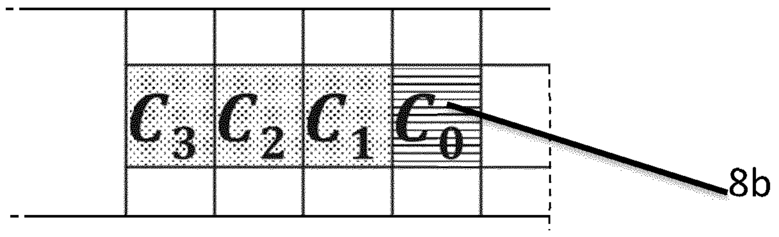
FIG. 11*b* shows an enlargement of a row of the rectangular band at the left side of FIG. 10 including a border edge zone of central display tile Dc.

A border edge zone of Dc (8*b*) has zones of either D0, D2, D4, or D6 directly adjacent thereto. An example thereof is shown in FIG. 11*b* which is an enlargement of a row of the rectangular band (9) at the left side on FIG. 10. FIG. 11*b* shows one border edge zone (8*b*) and zones of display tile D6 adjacent thereto. Such example of a border edge zone is developed further here below.

Before the algorithm of the present invention is applied, the brightness value of a border edge zone (8*b*) of display tile Dc is designated as $C_{0,0}$, the brightness values of the adjacent zones of display tile D6 in the three level rectangular band surrounding Dc are $C_1$, $C_2$, $C_3$. Upon applying the algorithm of the present invention, the brightness values $C_1$, $C_2$, $C_3$ are transmitted to display tile Dc and this information is used in order to calculate an adjusted brightness value designated as $C_{0,0,new}$. This calculation is expressed in formula 7.

$$C_{0,0,new} = \sum_{m=0}^{l} \frac{1}{Q_m} C_l \quad \text{(formula 7)}$$

1: total number of levels in the adjacent another display tile, a level being the number of the edge zones in one row or in one column of the adjacent another display tile, the first backlight brightness value of which is used in the calculation of $C_{0,0,new}$, C: brightness of the respective zone, Q: variable between 1 and ∞.

A typical example of Q could be for level 0: Q=1.2, level 1: Q=2, for level 2: Q=4, for level 3: Q=8.

The procedure as explained here above for a left border edge zone of the central display tile Dc is also applicable to each of the other border edge zones of display tile Dc. Applying results in adjusted brightness values in each border edge zone of Dc.

Having now by means of example determined adjusted brightness values for each of the edge zones of the central display tile Dc, clearly the processor may extend this to all edge zones of the other eight display tiles in the display wall such that for each edge zone an adjusted brightness value is determined based on the brightness value of the edge zone and the brightness value of at least one other zone of another display tile adjacent to the edge zone. This can be done simultaneously or sequentially for each edge zone of the display tiles of the display wall or simultaneously or sequentially for each display tile of the display wall.

In a next step, the backlight brightness values are input into a driver that controls in each zone of the display wall the at least one backlight light source associated therewith in order to generate a light output corresponding to the backlight brightness value determined for that zone, or corresponding to the adjusted backlight brightness value in case adjustment has been performed, the adjustment being determined based on the brightness value of the zone and the backlight brightness value of at least one other zone of another display tile adjacent thereto. The backlight light sources may be a backlight LED matrix containing in each zone at least one LED (e.g. white LEDs or RGB LEDs). The backlight light source for the zone is driven using a backlight driving level for that zone corresponding with the backlight brightness value determined for that zone inputted into the driver. The backlight driving level for that zone corresponding with the backlight brightness value determined for that zone may be retrieved using a predetermined look-up conversion table mapping backlight brightness values on backlight driving levels. The look-up table may be generated in a calibration phase wherein the light output of the LED is determined or measured for a range of backlight driving levels.

The procedure in accordance with the present invention as explained above for the display wall having nine display tiles in a three by three arrangement has been executed now for one image to be displayed in a distributed manner over the entire display wall. If the image to be displayed is a single static image, then there is no need to repeat the procedure. If the image is however a moving image or a plurality of images to be subsequently displayed, then this procedure may be repeated. The repetition frequency may be such that the procedure is repeated for each image frame, or e.g. each tenth frame, or any arbitrary frequency. The repetition frequency may be determined dependent on the amount of change of image content. For a next image frame, when determining zone backlight brightness values and/or adjusted backlight brightness values, also the backlight brightness value or adjusted backlight brightness value determined for that zone for the previous image frame may be taken into account.

Although the present invention has been explained for a display wall of nine display tiles in a three by three arrangement, it clearly can be used for any arrangement of at least two display tiles in any arrangement provided the display tiles are positioned adjacent to each other such as to reduce the gap or seam between adjacent display tiles to the extent possible. The gap or seam can be 5 mm, 2 mm or at least 1 mm or less. The maximum allowable gap or seam can be 10 mm.

The present invention has been explained for a flat display wall but may equally applied on curved display walls. The display wall may be a video display wall and/or a portrait display wall.

Figure 12:
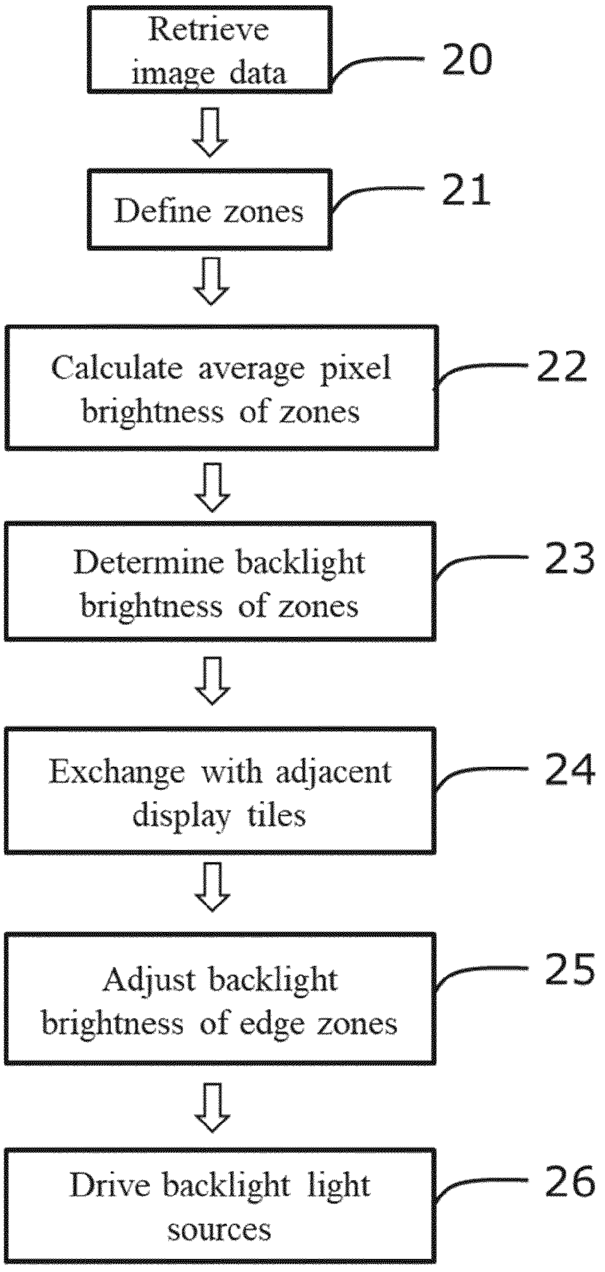
FIG. 12 shows a simplified workflow for displaying an image in accordance with the present invention.

In accordance with the invention in FIG. 12, a simplified workflow is shown for illustrating implementing the invention for displaying an image on, as an example, a display wall with 9 display tiles in a three by three arrangement as e.g. illustrated in FIG. 7. In a first step, image data of an image to be displayed on the tiled display are retrieved such that at least the part of the image data to be displayed on that display tile are input (20) to the local processor of the respective display tile. This is done for all 9 display tiles simultaneously. Each local processor then performs for its corresponding display tile, having multiple associated backlight sources for illuminating the display tile, the steps of defining (21) contiguous zones for the display tile such that each zone comprises at least one image pixel and that each zone has at least one associated backlight light source;

calculating (22) for each zone an average pixel brightness value for all the image pixels of that zone;

determining (23) a backlight brightness value for each zone;

exchanging (24) zone backlight brightness values with adjacent display tiles;

adjusting (25) at least for edge zones of the display tile the backlight brightness values based on the zone backlight brightness values exchanged; and driving (26) the backlight sources using backlight driving levels corresponding to the adjusted backlight brightness values.

Figure 13:
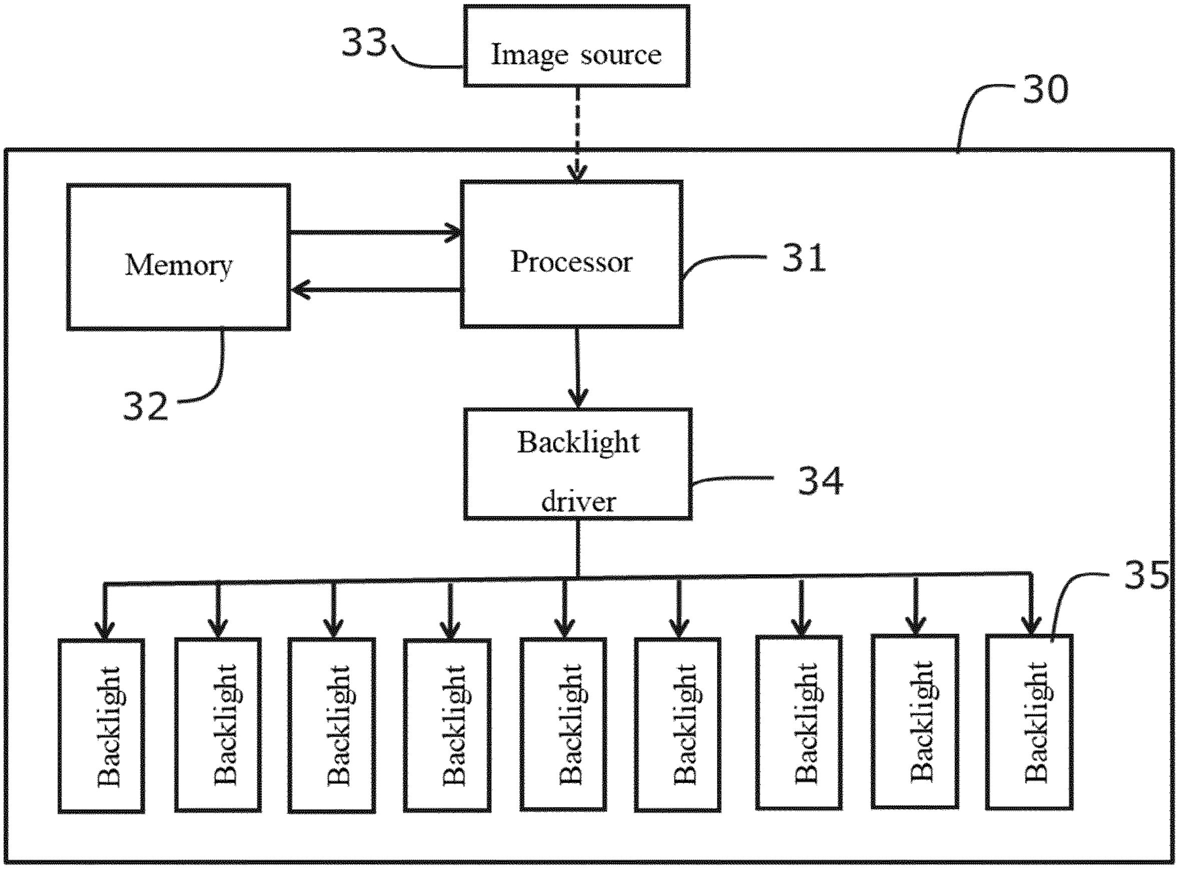
FIG. 13 shows an image display device in accordance with the present invention.

FIG. 13 shows an image display device for displaying an image distributed over plural display tiles of a tiled display according to the present invention. The image display device (30) comprises a processor (31), a plurality of blacklight light sources (35), e.g. LEDs, and a driver (34). The processor can be implemented as an on-board FPGA or a CPU. A memory (32) may be connected to the processor for (temporarily) storing data processed by the processor or data to be retrieved by or input to the processor such as e.g. a look-up table for mapping backlight light source values on backlight light source driving levels. The processor (31) is configured to retrieve image data related to an image to be displayed from an image data source (33), e.g. a PC, (not part of the image display device);

to define contiguous zones for each display tile such that each zone comprises at least one image pixel and that each zone has at least one associated backlight light source; the zones of each display tile comprising edge zones, being the zones having at least one side coinciding with an edge of the display tile;

to determine a first backlight brightness value for each zone of each display tile based on the image data associated with the image pixels in said zone;

to obtain at least in each of the edge zones of each of the display tiles a second backlight brightness value based on the first backlight brightness value of the edge zone and the first backlight brightness value of at least one other zone of another display tile adjacent to the edge zone;

to determine a backlight light source driving level for each zone based on the first or second backlight brightness value for the zone and input these driving level to the driver.

The driver (34) generates the driving levels or driving in each zone of each display tile the at least one associated backlight light source.

The processor (31) can also be implemented in a distributed way, meaning that the processor comprises a central processing part and plural local processing parts. A local processing part may be provided, for example, for each display tile of the tiled display. The local processing parts can each be implemented as an on-board FPGA or a CPU and being connected with one another via any connection known to the person skilled in the art including a network (LAN) connection, a cable, wireless, an RS232 connection, an optical connection, or an RF connection.

The present invention includes, without limitation, the following enumerated example aspects.

1. An image display device for displaying an image distributed over plural display tiles comprising a plurality of backlight light sources for illuminating the plural display tiles positioned adjacent to one another, each display tile having a plurality of contiguous zones being defined such that each zone comprises at least one image pixel, said plurality of zones of each display tile comprising edge zones, being the zones having at least one side coinciding with an edge of the display tile, said backlight light sources being configured such that each zone of each display tile has at least one backlight light source associated therewith, a processor configured to retrieve image data related to the image to be displayed, to determine a first backlight brightness value for each zone of each display tile based on the image data associated with the image pixels in said zone, and wherein the processor is configured to, at least in each of the edge zones of each of the display tiles, obtain a second backlight brightness value based on the first backlight brightness value of the edge zone and the first backlight brightness value of at least one other zone of another display tile adjacent to the edge zone, and a driver for driving in each edge zone of each display tile the at least one associated backlight light source in order to generate a backlight light output corresponding to the second backlight brightness value.

2. The image display device according to aspect 1, wherein the backlight light sources are LEDs arranged as a matrix backlight, and wherein the LEDs and the zones are configured such that each zone has a single LED associated therewith.

3. The image display device according to aspect 1, wherein the backlight light sources are LEDs arranged as a matrix backlight, and wherein the LEDs and the zones are configured such that each zone has at least one LED associated therewith.

4. The image display device according to any preceding aspect, wherein said processor is further configured to extract for each zone, from the image data retrieved, a brightness value for each pixel in the zone and to calculate the mean average of the brightness values of all pixels in the zone in order to obtain the first backlight brightness value for the zone.

5. The image display device according to aspect 4, wherein the processor is configured to multiply, when calculating the mean average of the backlight brightness values for each pixel in the zone, each pixel brightness value with a pixel weight having a value decreasing from the centre towards the border of the zone.

6. The image display device according to aspect 4 or 5, wherein the processor is configured to replace the first backlight brightness value of the zone by a predetermined value if the first backlight brightness value is greater than zero and smaller than the predetermined value.

7. The image display device according to any preceding aspect, wherein the processor is configured to obtain the second backlight brightness values for all edge zones simultaneously.

8. The image display device according to any preceding aspect, wherein the processor is configured to obtain second backlight brightness values for each image frame of the image.

9. The image display device according to any preceding aspect, wherein at a border between a display tile and another display tile, which is adjacent to the display tile, the second backlight brightness values of the edge zones of the display tile near the border are determined based on the first backlight brightness values of at least the edge zones of the another display tile near the border, and the second backlight brightness values of the edge zones of the another display tile near the border are determined based on the first backlight brightness values of at least the edge zones of the display tile near the border.

10. The image display device according to any preceding aspect, wherein at a border between a first display tile and second display tile, the second backlight brightness values of the edge zones of the first display tile near the border are determined based on the first backlight brightness values of at least the edge zones of the second display tile near the border, and the second backlight brightness values of the edge zones of the second display tile near the border are determined based on the first backlight brightness values of at least the edge zones of the first display tile near the border.

11. The image display device according to any preceding aspect, wherein said plurality of display tiles comprises at least four rectangular display tiles arranged in a matrix such that at least one corner edge zone of one of said rectangular display tiles is adjacent to three other rectangular display tiles, and wherein the processor is configured to obtain a second backlight brightness value for said corner edge zone based on the first backlight brightness value of the corner edge zone and the first backlight brightness values of at least one other zone of each of the three other rectangular display tiles adjacent to the corner edge zone.

12. The image display device according to any preceding aspect, wherein the processor is configured to determine for each second backlight brightness value a corresponding backlight driving level.

13. The image display device according to aspect 11 or 12, wherein the processor is configured to calculate the second backlight brightness value, designated as $B_{0,0,new}$, of said corner edge zone in accordance with the formula $$B_{0,0,new} = \sum_{m=0}^{l} \frac{1}{P_m} \sum_{n=1}^{2m+1} B_{m,n-1}$$

wherein

1: the total number of levels in the respective other adjacent display tiles, a level being the number of the at least one other zone in one row or in one column of the respective other adjacent display tiles, the first backlight brightness value of which is used in the calculation of $B_{0,0,new}$, m=0 is for the corner edge zone, m>0 is for the zones of the adjacent displays, B: backlight brightness value of the respective zone, P: variable between 1 and ∞.

14. The image display device according to any of the aspects 9 to 13, wherein the processor is configured to calculate the second backlight brightness value, designated as $C_{0,0,new}$, of an edge zone of the display tile near the border in accordance with the formula $$C_{0,0,new} = \sum_{m=0}^{l} \frac{1}{Q_m} C_l$$

wherein

1: total number of levels in the adjacent another display tile, a level being the number of the edge zones in one row or in one column of the adjacent another display tile, the first backlight brightness value of which is used in the calculation of $C_{0,0,new}$, m=0 is for the edge zone of the display tile, m>0 is for the edge zones of the adjacent another display, C: backlight brightness of the respective zone, Q: variable between 1 and ∞.

15. A method for displaying an image distributed over plural display tiles positioned adjacent to one another, each display tile having multiple associated backlight sources for illuminating the display tile, each display tile having a plurality of contiguous zones being defined such that each zone comprises at least one image pixel, said plurality of zones of each display tile comprising edge zones, being the zones having at least one side coinciding with an edge of the display tile, said backlight light sources being configured such that each zone of each display tile has at least one backlight light source associated therewith, the method comprising the steps of retrieving image data related to the image to be displayed for each zone of each display tile; determining a first backlight brightness value for each zone of each display tile based on the image data associated with the image pixels in said zone;

obtaining at least in each of the edge zones of each display tile a second backlight brightness value based on the first backlight brightness value of the edge zone and the first backlight brightness value of at least one other zone of another display tile adjacent to the edge zone; and driving in each edge zone of each display tile the at least one associated backlight light source in order to generate a backlight light output corresponding to the second backlight brightness value.

16. The method according to aspect 15, wherein retrieving image data is retrieving image frames and wherein the method is repeated for each image frame of the image or for each nth frame of the image or in accordance with any arbitrary frequency.

17. The method according to aspect 15 or 16, wherein a processor is configured to retrieve image data related to the image to be displayed for each zone of each display tile, and to determine a first backlight brightness value for each zone of each display tile based on the image data associated with the image pixels in said zone; and to calculate at least in each of the edge zones of each display tile a second backlight brightness value based on the first backlight brightness value of the edge zone and the first backlight brightness value of at least one other zone of another display tile adjacent to the edge zone; and to control driving in each edge zone of each display tile the at least one associated backlight light source in order to generate a backlight light output corresponding to the second backlight brightness value.

18. The method according to aspect 15, further comprising the steps of extracting for each zone from the image data retrieved a brightness value for each pixel in the zone, and calculating for each zone the mean average of the brightness values of all pixels in the zone in order to obtain the first backlight brightness value for the zone.

19. The method according to aspect 17, wherein the processor is configured to extract, for each zone from the image data retrieved, a brightness value for each pixel in the zone, and configured to calculate for each zone the mean average of the brightness values of all pixels in the zone in order to obtain the first backlight brightness value for the zone.

20. The method according to aspect 18, further comprising the step of multiplying, when calculating for each zone the mean average for the zone, the brightness value for each pixel in the zone with a pixel weight having a value decreasing from the centre towards the border of the zone.

21. The method according to aspect 19, wherein the processor is configured to multiply, when calculating for each zone the mean average for the zone, the brightness value for each pixel in the zone with a pixel weight having a value decreasing from the centre towards the border of the zone.

22. A method according to any of the aspects 15 to 21, further comprising the steps of determining at a border between a display tile and another display tile, which is adjacent to display tile, the second backlight brightness values of the edge zones of the display tile near the border based on the first backlight brightness values of at least the edge zones of the another display tile near the border, and determining the second backlight brightness values of the edge zones of the another display tile near the border based on the first backlight brightness values of at least the edge zones of the display tile near the border.

23. The method according to any of the aspects 17 to 22, wherein the processor is configured to determine at a border between a display tile and another display tile, which is adjacent to the display tile, the second backlight brightness values of the edge zones of the display tile near the border based on the first backlight brightness values of at least the edge zones of the another display tile near the border, and configured to determine the second backlight brightness values of the edge zones of the another display tile near the border based on the first backlight brightness values of at least the edge zones of the display tile near the border.

24. A method according to any of the aspects 15 to 23, wherein said plural display tiles comprise at least four rectangular display tiles arranged in a matrix such that at least one corner edge zone of one of said rectangular display tiles is adjacent to three other rectangular display tiles, and wherein a second backlight brightness value for said corner edge zone is obtained based on the first backlight brightness value of the corner edge zone and the first backlight brightness values of at least one other zone of each of the three other rectangular display tiles adjacent to the corner edge zone.

25. A method according to aspect 24, comprising the step of calculating the second backlight brightness value, designated as $B_{0,0,new}$, of said corner edge zone in accordance with the formula $$B_{0,0,new} = \sum_{m=0}^{l} \frac{1}{P_m} \sum_{n=1}^{2m+1} B_{m,n-1}$$

wherein

1: the total number of levels in the respective other adjacent display tiles, a level being the number of the at least one other zone in one row or in one column of the respective other adjacent display tiles, the first backlight brightness value of which is used in the calculation of the second backlight brightness value $B_{0,0,new}$, m=0 is for the corner edge zone, m>0 is for the zones of the adjacent displays, B: backlight brightness value of the respective zone, P: variable between 1 and ∞.

26. A method according to any to the aspects 22 to 25, comprising the step of calculating the second backlight brightness value, designated as $C_{0,0,new}$, of an edge zone of the display tile near the border in accordance with the formula $$C_{0,0,new}=\sum_{m=0}^{l}\frac{1}{Q_m}C_l$$

wherein

1: total number of levels in the adjacent another display tile, a level being the number of the edge zones in one row or in one column of the adjacent another display tile, the first backlight brightness value of which is used in the calculation of $C_{0,0,new}$, m=0 is for the edge zone of the display tile, m>0 is for the edge zones of the adjacent another display, C: backlight brightness of the respective zone, Q: variable between 1 and ∞.

27. A method according to any of the aspects 15 to 26, wherein said plural display tiles comprise at least four rectangular display tiles arranged in a matrix such that at least one corner edge zone of one of said rectangular display tiles is adjacent to three other rectangular display tiles, and wherein a processor is configured to obtain a second backlight brightness value for said corner edge zone based on the first backlight brightness value of the corner edge zone and the first backlight brightness values of at least one other zone of each of the three other rectangular display tiles adjacent to the corner edge zone.

28. A method according to aspect 27, wherein the processor is configured to calculate the second backlight brightness value, designated as $B_{0,0,new}$, of said corner edge zone in accordance with the formula $$B_{0,0,new}=\sum_{m=0}^{l}\frac{1}{P_m}\sum_{n=1}^{2m+1}B_{m,n-1}$$

wherein

1: the total number of levels in the respective other adjacent display tiles, a level being the number of the at least one other zone in one row or in one column of the respective other adjacent display tiles, the first backlight brightness value of which is used in the calculation of the second backlight brightness value $B_{0,0,new}$, m=0 is for the corner edge zone, m>0 is for the zones of the adjacent displays, B: backlight brightness value of the respective zone, P: variable between 1 and ∞.

29. A method according to any of the aspects 23, 24, 25, 27, 28, wherein the processor is configured to calculate the second backlight brightness value, designated as $C_{0,0,new}$, of an edge zone of the display tile near the border in accordance with the formula $$C_{0,0,new}=\sum_{m=0}^{l}\frac{1}{Q_m}C_l$$

wherein

1: total number of levels in the adjacent another display tile, a level being the number of the edge zones in one row or in one column of the adjacent another display tile, the first backlight brightness value of which is used in the calculation of $C_{0,0,new}$, m=0 is for the edge zone of the display tile, m>0 is for the edge zones of the adjacent another display, C: brightness of the respective zone, Q: variable between 1 and ∞.

30. A device for controlling backlight light for displays, the device comprising a plurality of backlight light sources for illuminating plural display tiles positioned adjacent to one another, each display tile having a plurality of contiguous zones being defined such that each zone comprises at least one image pixel, said plurality of zones of each display tile comprising edge zones, being the zones having at least one side coinciding with an edge of the display tile, said backlight light sources being configured such that each zone of each display tile has at least one backlight light source associated therewith;

a processor configured to retrieve image data related to the image to be displayed and configured to determine a first backlight brightness value for each zone of each display tile based on the image data associated with the image pixels in said zone, and configured to obtain, at least in each of the edge zones of each of the display tiles, a second backlight brightness value based on the first backlight brightness value of the edge zone and the first backlight brightness value of at least one other zone of another display tile adjacent to the edge zone.

31. The device according to aspect 30, further comprising a driver configured to drive in each edge zone of each display tile the at least one associated backlight light source in order to generate a backlight light output corresponding to the second backlight brightness value.

32. The device according to aspect 30 or 31, wherein the backlight light sources are LEDs arranged as a matrix backlight, and wherein the LEDs and the zones are configured such that each zone has a single LED associated therewith.

33. The device according to aspect 30 or 31, wherein the backlight light sources are LEDs arranged as a matrix backlight, and wherein the LEDs and the zones are configured such that each zone has at least one LED associated therewith.

34. The device according to any of the aspects 30 to 33, wherein said processor is further configured to extract for each zone, from the image data retrieved, a brightness value for each pixel in the zone and to calculate the mean average of the brightness values of all pixels in the zone in order to obtain the first backlight brightness value for the zone.

35. The device according to aspect 34, wherein the processor is configured to multiply, when calculating the mean average of the backlight brightness values for each pixel in the zone, each pixel brightness value with a pixel weight having a value decreasing from the centre towards the border of the zone.

36. The device according to any of the aspects 30 to 35, wherein the processor is configured to replace the first backlight brightness value of the zone by a predetermined value if the first backlight brightness value is greater than zero and smaller than the predetermined value.

37. The device according to any of the aspects 30 to 36, wherein the processor is configured to obtain the second backlight brightness values for all edge zones simultaneously.

38. The device according to any of the aspects 30 to 37, wherein the processor is configured to obtain second backlight brightness values for each image frame of the image.
39. The device according to any of the aspects 30 or 38, in which device at a border between a display tile and another display tile, which is adjacent to the display tile, the second backlight brightness values of the edge zones of the display tile near the border are determined based on the first backlight brightness values of at least the edge zones of the another display tile near the border, and the second backlight brightness values of the edge zones of the another display tile near the border are determined based on the first backlight brightness values of at least the edge zones of the display tile near the border.
40. The device according to any of the aspects 30 to 39, wherein said plurality of display tiles comprises at least four rectangular display tiles arranged in a matrix such that at least one corner edge zone of one of said rectangular display tiles is adjacent to three other rectangular display tiles, and wherein the processor is configured to obtain a second backlight brightness value for said corner edge zone based on the first backlight brightness value of the corner edge zone and the first backlight brightness values of at least one other zone of each of the three other rectangular display tiles adjacent to the corner edge zone.
41. The device according to any of the aspects 30 to 31, wherein the processor is configured to determine for each second backlight brightness value a corresponding backlight driving level.
42. The device according to aspect 41 or 41, wherein the processor is configured to calculate the second backlight brightness value, designated as $B_{0,0,new}$, of said corner edge zone in accordance with the formula $$B_{0,0,new} = \sum_{m=0}^{l} \frac{1}{P_m} \sum_{n=1}^{2m+1} B_{m,n-1}$$

wherein

1: the total number of levels in the respective other adjacent display tiles, a level being the number of the at least one other zone in one row or in one column of the respective other adjacent display tiles, the first backlight brightness value of which is used in the calculation of $B_{0,0,new}$, m=0 is for the corner edge zone, m>0 is for the zones of the adjacent displays, B: backlight brightness value of the respective zone, P: variable between 1 and ∞.

43. The device according to any of the aspects 39 to 42, wherein the processor is configured to calculate the second backlight brightness value, designated as $C_{0,0,new}$, of an edge zone of the display tile near the border in accordance with the formula $$C_{0,0,new} = \sum_{m=0}^{l} \frac{1}{Q_m} C_l$$

wherein

1: total number of levels in the adjacent another display tile, a level being the number of the edge zones in one row or in one column of the adjacent another display tile, the first backlight brightness value of which is used in the calculation of $C_{0,0,new}$, m=0 is for the edge zone of the display tile, m>0 is for the edge zones of the adjacent another display, C: backlight brightness of the respective zone, Q: variable between 1 and ∞.

44. Computer program product comprising instructions which, when the program is executed by at least one computer, cause at least one processor to carry out the method of any of the aspect 15 to 29.
45. Computer program product according to aspect 44, whereby the processor is configured as in aspect 16, 18, 20, 22, 26, 27 and 28.
46. A non-transitory signal storage means storing the computer program product of aspect 44 or aspect 45.

The invention claimed is:

1. An image display device for displaying an image distributed over a plurality of display tiles, the image display comprising:

a plurality of backlight light sources respectively illuminating the plurality of display tiles, wherein, for each of the plurality of display tiles defining a plurality of contiguous zones, each of the plurality of contiguous zones comprises at least one image pixel, the plurality of contiguous zones including edge zones and other zones surrounded by the edge zones, the edge zones being the zones comprising image pixels disposed on a periphery of a display tile that are adjacent to edge zones in adjacent display tiles, said backlight light sources being configured such that each zone of each of the plurality of display tiles has at least one backlight light source associated therewith, wherein the plurality of display tiles are discrete separate display tiles adjacent to one another, a processor configured to:

retrieve image data related to the image to be displayed on the plurality of display tiles of the image display device, determine a first backlight brightness value for an edge zone of a first display tile based on the image data associated with the image pixels of the edge zone of the first display tile, and obtain a second backlight brightness value for the edge zone of the first display tile based on the first backlight brightness value and the first backlight brightness value of at least an edge zone of two or more adjacent display tiles that are adjacent to the first display tile, and a driver for driving a backlight light source associated to the edge zone of the first tile to generate a backlight light output corresponding to the second backlight brightness value of the edge zone of the first tile.

2. The image display device according to claim 1, wherein the backlight light sources are LEDs arranged as a matrix backlight, and wherein the LEDs and the zones are configured such that each zone has a single LED associated therewith, or wherein the backlight light sources are LEDs arranged as a matrix backlight, and wherein the LEDs and the zones are configured such that each zone has at least one LED associated therewith.

3. The image display device according to claim 1, wherein said processor is further configured to extract for each zone, from the image data retrieved, a brightness value for each pixel in the zone and to calculate a mean average of the brightness values of all pixels in the zone in order to obtain the first backlight brightness value for the zone, and/or wherein the processor is configured to multiply, when calculating the mean average of the backlight brightness values for each pixel in the zone, each pixel brightness value with a pixel weight having a value decreasing from a centre towards a border of the zone, and/or wherein the processor is configured to replace the first backlight brightness value of the zone by a predetermined value if the first backlight brightness value is greater than zero and smaller than the predetermined value.

4. The image display device according to claim 1, wherein the processor is configured to obtain the second backlight brightness values for all edge zones simultaneously, or wherein the processor is configured to obtain second backlight brightness values for each image frame of the image.

5. The image display device according to claim 1, wherein at a border between a display tile and another display tile, which is adjacent to the display tile, the second backlight brightness values of the edge zones of the display tile near the border are determined based on the first backlight brightness values of at least the edge zones of the another display tile near the border, and the second backlight brightness values of the edge zones of the another display tile near the border are determined based on the first backlight brightness values of at least the edge zones of the display tile near the border.

6. The image display device according to claim 1, wherein said plurality of display tiles comprises at least four rectangular display tiles arranged in a matrix such that at least one corner edge zone of one of said rectangular display tiles is adjacent to three other rectangular display tiles, and wherein the processor is configured to obtain a second backlight brightness value for said corner edge zone based on the first backlight brightness value of the corner edge zone and the first backlight brightness values of at least one other zone of each of the three other rectangular display tiles adjacent to the corner edge zone.

7. The image display device according to claim 1, wherein the processor is configured to determine for each second backlight brightness value a corresponding backlight driving level, and/or wherein the processor is configured to calculate the second backlight brightness value, designated as $B_{0,0,new}$, of a corner edge zone in accordance with the formula $$B_{0,0,new} = \sum_{m=0}^{1} \frac{1}{P_m} \sum_{n=1}^{2m+1} B_{m,n-1}$$

wherein,

1: total number of levels in the respective other adjacent display tiles, a level being the number of the at least one other zone in one row or in one column of the respective other adjacent display tiles, the first backlight brightness value of which is used in the calculation of $B_{0,0,new}$, m=0 is for the corner edge zone, m>0 is for the zones of the adjacent displays, B: backlight brightness value of the respective zone, P: variable between 1 and ∞.

8. The image display device according to claim 5, wherein the processor is configured to calculate the second backlight brightness value, designated as $C_{0,0,new}$, of an edge zone of the display tile near the border in accordance with the formula $$C_{0,0,new} = \sum_{m=0}^{l} \frac{1}{Q_m} C_l$$

wherein

1: total number of levels in the adjacent another display tile, a level being the number of the edge zones in one row or in one column of the adjacent another display tile, the first backlight brightness value of which is used in the calculation of $C_{0,0,new}$, m=0 is for the edge zone of the display tile, m>0 is for the edge zones of the adjacent another display, C: backlight brightness of the respective zone, Q: variable between 1 and co.

9. A method for displaying an image distributed over a plurality of display tiles positioned adjacent to one another, wherein the plurality of display tiles are discrete separate display tiles adjacent to one another, each of the plurality of display tiles having multiple associated backlight sources for illuminating the display tile, each of the plurality of display tiles defining a plurality of contiguous zones, each of the plurality of contiguous zones comprising at least one image pixel, said plurality of contiguous zones including edge zones and other zones surrounded by the edge zones, the edge zones being the zones comprising image pixels disposed on a periphery of a display that are adjacent to edge zones in adjacent display tiles, said backlight light sources being configured such that each zone of each of the plurality of display tiles has at least one backlight light source associated therewith, the method comprising the steps of:

retrieving image data related to the image to be displayed on an image display device for each zone of each of the plurality of display tiles;

determining a first backlight brightness value for an edge zone of a first display tile based on the image data associated with the image pixels of the edge zone of the first display tile;

obtaining a second backlight brightness value for the edge zone of the first display tile based on the first backlight brightness value and the first backlight brightness value of at least an edge zone of two or more display tiles that are adjacent to the first display tile; and driving a backlight light source associated to the edge zone of the first display tile to generate a backlight light output corresponding to the second backlight brightness value of the edge zone of the first tile.

10. The method according to claim 9, wherein retrieving image data is retrieving image frames and wherein the method is repeated for each image frame of the image or for each nth frame of the image or in accordance with any arbitrary frequency.

11. The method according to claim 9, wherein a processor is configured to retrieve image data related to the image to be displayed for each zone of each of the plurality of display tiles, and to determine a first backlight brightness value for each zone of each of the plurality of display tiles based on the image data associated with the image pixels in said zone; and to calculate at least in each of the edge zones of each of the plurality of display tiles a second backlight brightness value based on the first backlight brightness value of the edge zone and the first backlight brightness value of at least one other zone of another display tile adjacent to the edge zone; and to control driving in each edge zone of each of the plurality of display tiles the at least one associated backlight light source in order to generate a backlight light output corresponding to the second backlight brightness value, and/or wherein the processor is configured to extract, for each zone from the image data retrieved, a brightness value for each pixel in the zone, and configured to calculate for each zone a mean average of the brightness values of all pixels in the zone in order to obtain the first backlight brightness value for the zone.

12. The method according to claim 9, further comprising the steps of:

extracting for each zone from the image data retrieved a brightness value for each pixel in the zone, and calculating for each zone a mean average of the brightness values of all pixels in the zone in order to obtain the first backlight brightness value for the zone, and/or further comprising the step of multiplying, when calculating for each zone the mean average for the zone, the brightness value for each pixel in the zone with a pixel weight having a value decreasing from a centre towards a border of the zone.

13. The method according to claim 9, further comprising the steps of determining at a border between a display tile and another display tile, which is adjacent to display tile, the second backlight brightness values of the edge zones of the display tile near the border based on the first backlight brightness values of at least the edge zones of the another display tile near the border, and determining the second backlight brightness values of the edge zones of the another display tile near the border based on the first backlight brightness values of at least the edge zones of the display tile near the border.

14. A device for controlling backlight light for displays, the device comprising:

a plurality of backlight light sources respectively illuminating a plurality of display tiles, the plurality of display tiles being discrete separate display tiles adjacent to one another, each of the plurality of display tiles having a plurality of contiguous zones, each of the plurality of contiguous zones comprising at least one image pixel, said plurality of contiguous zones including edge zones and other zones surrounded by the edges zones, the edge zones being the zones comprising image pixels disposed on a periphery of a display tile that are adjacent to edge zones in adjacent display tiles, said backlight light sources being configured such that each zone of each of the plurality of display tiles has at least one backlight light source associated therewith;

a processor configured to retrieve image data related to the image to be displayed on the image display device and configured to determine a first backlight brightness value for an edge zone of a first display tile based on the image data associated with the image pixels of the edge zone of the first display tile, and configured to obtain a second backlight brightness value for the edge zone of the first display tile based on the first backlight brightness value and the first backlight brightness value of at least an edge zone of two or more adjacent display tiles that are adjacent to the first display tile.

15. The device according to claim 14, further comprising a driver configured to drive in each edge zone of each of the plurality of display tiles the at least one associated backlight light source in order to generate a backlight light output corresponding to the second backlight brightness value.

16. The device according to claim 14, wherein said processor is further configured to extract for each zone, from the image data retrieved, a brightness value for each pixel in the zone and to calculate a mean average of the brightness values of all pixels in the zone in order to obtain the first backlight brightness value for the zone, and/or wherein the processor is configured to multiply, when calculating the mean average of the backlight brightness values for each pixel in the zone, each pixel brightness value with a pixel weight having a value decreasing from a centre towards a border of the zone.

17. The device according to claim 14, wherein the processor is configured to replace the first backlight brightness value of the zone by a predetermined value if the first backlight brightness value is greater than zero and smaller than the predetermined value, and/or wherein the processor is configured to obtain the second backlight brightness values for all edge zones simultaneously, and/or wherein the processor is configured to obtain second backlight brightness values for each image frame of the image.

18. The device according to claim 14, in which device at a border between a display tile and another display tile, which is adjacent to the display tile, the second backlight brightness values of the edge zones of the display tile near the border are determined based on the first backlight brightness values of at least the edge zones of the another display tile near the border, and the second backlight brightness values of the edge zones of the another display tile near the border are determined based on the first backlight brightness values of at least the edge zones of the display tile near the border.

19. The device according to claim 14, wherein said plurality of display tiles comprises at least four rectangular display tiles arranged in a matrix such that at least one corner edge zone of one of said rectangular display tiles is adjacent to three other rectangular display tiles, and wherein the processor is configured to obtain a second backlight brightness value for said corner edge zone based on the first backlight brightness value of the corner edge zone and the first backlight brightness values of at least one other zone of each of the three other rectangular display tiles adjacent to the corner edge zone.

20. The device according to claim 19, wherein the processor is configured to determine for each second backlight brightness value a corresponding backlight driving level, and/or wherein the processor is configured to calculate the second backlight brightness value, designated as $B_{0,0,new}$, of said corner edge zone in accordance with the formula $$B_{0,0,new} = \sum_{m=0}^{1} \frac{1}{P_m} \sum_{n=1}^{2m+1} B_{m,n-1}$$

wherein,

1: the total number of levels in the respective other adjacent display tiles, a level being the number of the at least one other zone in one row or in one column of the respective other adjacent display tiles, the first backlight brightness value of which is used in the calculation of $B_{0,0,new}$, m=0 is for the corner edge zone, m>0 is for the zones of the adjacent displays, B: backlight brightness value of the respective zone,
P: variable between 1 and ∞.

21. The device according to claim 18, wherein the processor is configured to calculate the second backlight brightness value, designated as $C_{0,0,new}$, of an edge zone of the display tile near the border in accordance with the formula $$C_{0,0,new} = \sum_{m=0}^{l} \frac{1}{Q_m} C_l$$

wherein

1: total number of levels in the adjacent another display tile, a level being the number of the edge zones in one row or in one column of the adjacent another display tile, the first backlight brightness value of which is used in the calculation of $C_{0,0,new}$, m=0 is for the edge zone of the display tile, m>0 is for the edge zones of the adjacent another display, C: backlight brightness of the respective zone, Q: variable between 1 and ∞.

* * * * *